Sept. 25, 1962
J. MARTIN
3,055,621
PARACHUTE APPARATUS
Filed June 9, 1961
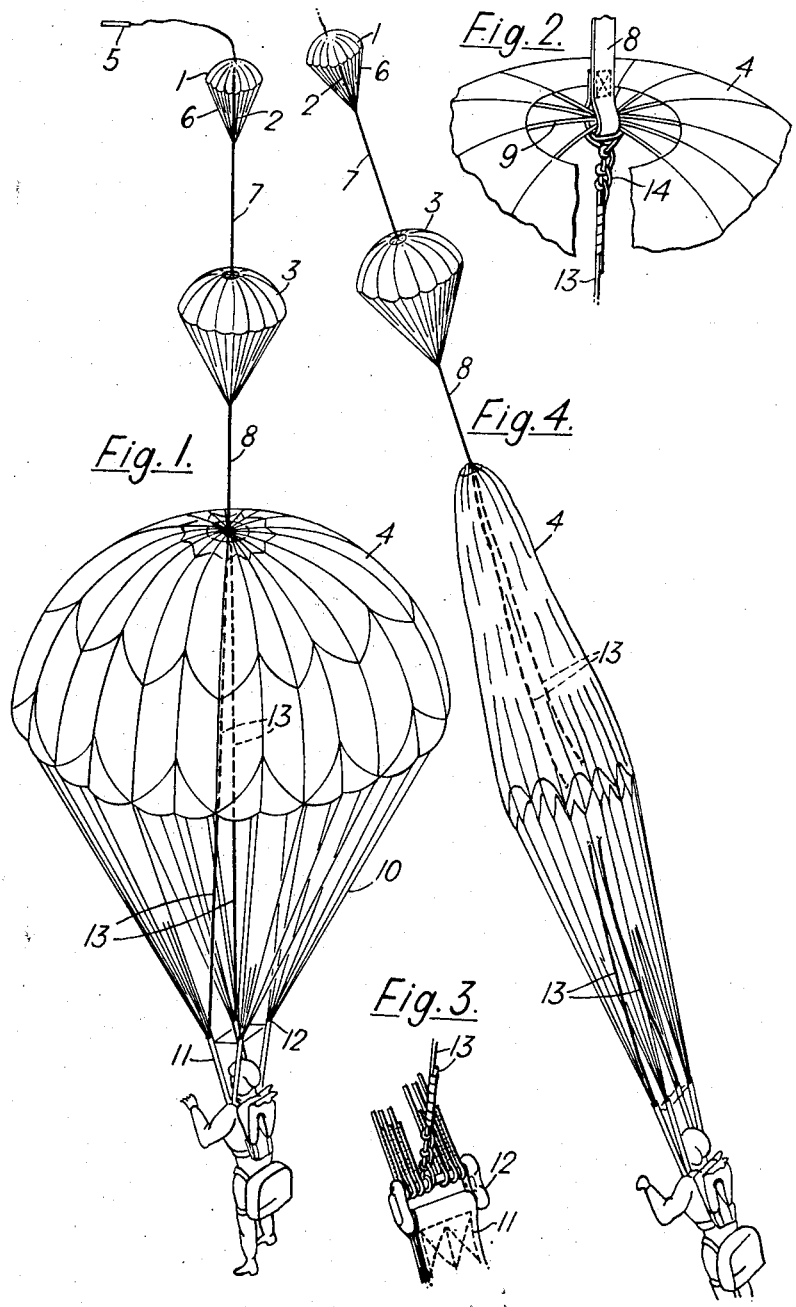

United States Patent Office 3,055,621
Patented Sept. 25, 1962

3,055,621
PARACHUTE APPARATUS
James Martin, Southlands Manor, Southlands Road, Denham, near Uxbridge, England
Filed June 9, 1961, Ser. No. 116,104
Claims priority, application Great Britain June 23, 1960
7 Claims. (Cl. 244—142)

This invention concerns improvements in parachute apparatus of the kind in which two or more parachutes of successively increasing diameters are connected together in series and are adapted to be deployed in succession, the deployment of any parachute of the series, subsequent to the first, being influenced by the deployment of the preceding parachute in the series which acts as a drogue parachute for the immediately succeeding parachute. More particularly the invention is concerned with parachute apparatus employing at least three parachutes in series, namely a first or controller parachute, a drogue parachute, and a main or personal parachute, the first or controller parachute of the series being arranged for projection into the air by a deploying member when the deployment of the controller parachute is required to initiate the deployment of the succeeding drogue parachute of the series.

Whilst parachute apparatus according to this invention may be used in other connections, e.g. for retrieving one body or package released by another whilst in flight, the invention is primarily concerned with parachute apparatus of the kind referred to for use with aircraft ejection seats.

In effecting the deployment of a series of parachutes such as above described, there are two objects which it is desired to achieve but which are of a somewhat conflicting character. The first of these objects is to deploy the parachutes as quickly as possible in order that they will commence to perform their respective functions as quickly as possible, this being very important when the parachutes are to be deployed near to the ground and especially so when they include a parachute supporting a human being or carrying delicate or valuable equipment. The other or second of the said conflicting objects is to avoid opening the parachutes so rapidly or explosively as to cause the bursting of one or more of them.

The relative air speed at which a parachute may be deployed safely is, to a large extent, a function of the size of the parachute; thus, the smaller the diameter of the parachute, the higher the relative air speed at which it may be deployed safely. Generally speaking, the relative air speed at which a parachute may be deployed safely (i.e. without serious danger of bursting) may be increased by causing an elongation or squidding of the parachute in the initial stages of its deployment, this elongation or squidding being effected by exerting a pull on the crown of the parachute, for example by a preceding parachute. Thus, U.S. Patent No. 2,762,588 describes the use of a pilot or control parachute for causing initial elongation or squidding of an immediately succeeding drogue parachute, thereby temporarily to delay the full deployment of the latter parachute. In the said Patent the use of the controller parachute is described in connection with an aircraft ejection seat of the general character set forth in U.S. Patent No. 2,467,763, the said drogue parachute being connected to the ejection seat and also to an airman's main or personal parachute and the arrangement being such that, after the ejection of the said seat from an aircraft, the controller parachute is first forcibly projected into the air stream and deployed for withdrawing the drogue parachute from its housing and causing such drogue parachute initially to elongate or squid temporarily to retard or delay its full deployment, this drogue parachute thus serving progressively to bring the ejection seat into, or substantially into, the line of flight and then being released (for example, as described in U.S. Patent No. 2,708,083) from the ejection seat so that it then withdraws the main or personal parachute from its housing for deployment to separate the airman from the ejection seat and to support him during his descent. In the arrangement described in the said Patent No. 2,762,588, after the launching of the ejection seat, the controller parachute is forcibly projected into the air stream by a deploying member in the form of a projectile or piston normally housed in a drogue gun carried by the ejection seat and from which the deploying member is automatically propelled by means such as an explosive cartridge, the deploying member being connected to the crown of the controller parachute by a draw line.

The forcible projection of a controller parachute as above described causes this parachute to elongate or squid, thus retarding or delaying the deployment of the controller parachute, the elongation or squidding appearing to occur however carefully the mass of the deploying member and the velocity at which it is projected may be chosen. Delay in the full deployment of the controller parachute necessarily involves the risk of premature and uncontrolled deployment of the succeeding parachute or parachutes of the series with the attendant risk of bursting the same consequent upon explosive opening: because of the ever increasing relative air speeds at which parachutes (and particularly those used in high speed aircraft for which purpose this invention is especially suitable) are required to be deployed, it is becoming more and more important that any such risks should be eliminated or reduced and it is proposed in U.S. Patent No. 2,999,629 to connect the crown of the controller parachute, by an anti-squid line located within the parachute, to the connected ends of the shroud lines of such parachute or to a further line or part securely attached to such ends and to have the deploying member for forcibly projecting the controller parachute into the air connected to one end of a draw line of which the other end is connected to the crown of the controller parachute in such a manner that tension applied to the said draw line by the deploying member will be transmitted to the said anti-squid line.

The said anti-squid line is to be of such a length and tensile strength as to permit the full deployment of the controller parachute but to prevent at all relative air speeds any substantial elongation or squidding of the controller parachute, such line serving to relieve the canopy of the controller parachute of the tension applied by the said deploying member to the draw line connected to the controller parachute and to transmit, without itself breaking, such tension to the connected ends of the shroud lines of the controller parachute or to said further line or part securely attached to such ends.

Experiments have shown that although parachute apparatus as described in the said U.S. Patent No. 2,999,659 works very satisfactorily where ejection takes place at high relative air speeds (e.g. 200 to 400 knots) and substantial elevations, nevertheless still further improvement would be advantageous for dealing with ejections at low relative air speeds (e.g. 90 to 150 knots) and near to the ground or a flight deck, as for example in the case of the ejection of an aircraft ejection seat from an aircraft on a runway or flight deck, or close to the ground or to a flight deck with the aircraft travelling at a low relative air speed such as an air speed of or approaching that of landing speed, e.g. 90 to 150 knots. Where the parachutes are brought into use as such low relative air speeds, there is a danger that the main or personal parachute will squid, due to the action thereon of the preceding drogue parachute of the series, and that it will not be deployed rapidly enough to ensure a gentle and safe deposit of its load, and this is specially the case if the load exceeds the normal maximum load for the main or personal parachute, e.g. a load of about 350-lbs. for a standard 24 foot parachute.

It is an object of this invention to provide a simple and efficient means for reducing the possibility of the occurrence of inadequate and insufficiently rapid deployment of the main or personal parachute when deployment is to be effected at low speeds and low altitudes such as, for example, aircraft landing speeds at or near ground or flight deck level.

The main or personal parachute will hereinafter be referred to as a "main" parachute except in the subsequent description of one embodiment of the invention applied to an aircraft ejection seat.

According to one aspect of this invention there is provided parachute apparatus comprising at least a main and a drogue parachute interconnected in series and wherein flexible anti-squid means are provided within the main parachute, such anti-squid means being such as to prevent the main parachute from squidding when deployed at low relative air speeds and thus to speed its opening at such speeds, but nevertheless being adapted to become ineffective and to permit the main parachute to squid when such parachute is deployed at high relative air speeds, thereby to reduce the rate of opening of the parachute at such high relative air speeds.

According to another aspect of the invention, there is provided parachute apparatus comprising at least a main and a drogue parachute interconnected in series and wherein the main parachute is furnished with flexible means of appropriate length lying within the main parachute assembly with one end affixed to or adjacent to the crown of the parachute and the other end affixed to any convenient point on said apparatus most remote from the crown of the main parachute and connected to or adapted for connection to the object to be supported by the parachute, said flexible means being such that when the main parachute is deployed at low relative air speeds it will prevent such parachute from squidding but such that when the main parachute is deployed at high relative air speeds, the pull exerted on the flexible anti-squid means of the main parachute by the drogue parachute will be adequate to part said means and so leave the main parachute free to squid in the normal manner.

According to a further feature of the invention, the said anti-squid means of the main parachute comprises at least one flexible line affixed at one end to the crown of the parachute and extending within the latter from the crown thereof to a position remote from such crown where it is connected to, or adapted for connection to, means for transmitting the pull of the main parachute to the object to be supported by the parachute, said anti-squid line being arranged to prevent the main parachute from squidding when it is deployed at low relative air speeds but to release the main parachute for squidding when such parachute is deployed at high relative air speeds.

Whilst when the anti-squid means of the main parachute are subjected to the pull applied thereto by the deployment of the main parachute at high relative air speeds, the release of the main parachute for squidding may be achieved by arranging for the anti-squid means to part from its connections at either end thereof or at a position between its ends by providing a separable connection (e.g. a shear pin) at one or both ends of the anti-squid means or at an intermediate position therein, it is nevertheless preferred to use at least one continuous anti-squid line permanently affixed at its ends to the parachute and to the object to be supported or to means adapted to be connected to such object, e.g. the junction of the shroud lines of the main parachute with the lift webs, and to form the anti-squid line of a material having such a tensile strength that it will break when the main parachute is deployed at high relative air speeds but which will not break when the parachute is deployed at low relative air speeds.

Thus according to a further aspect of the invention there is provided parachute apparatus comprising at least a main and a drogue parachute interconnected in series and wherein the main parachute is furnished with a flexible anti-squid line which is affixed at one end to the crown of the parachute and extends within the latter from the crown thereof to those ends of the shroud lines of the parachute that are connected to the lift webs for transmitting the pull of the parachute to the object to be supported by the parachute and to which ends of the shroud lines the second end of said anti-squid line is attached, said anti-squid line being of such a tensile strength that when the main parachute is deployed at low relative air speeds it will prevent such parachute from squidding but such that when the main parachute is deployed at high relative air speeds, the pull exerted on the anti-squid line of the main parachute by the drogue parachute will be adequate to break the anti-squid line of the main parachute and so leave the latter free to squid in the normal manner.

When the parachute apparatus is used in an aircraft ejection seat, then the said main parachute will serve as a personal parachute for the airman using the ejection seat and the said lift webs will be attached to the airman's body harness. However where the object to be supported by the main parachute is other than an airman, the said lift webs may be replaced by any appropriate form of suspension means for carrying the object.

Further aspects and features of the invention will become apparent from the following description of one embodiment of the invention which is given as an example in order that the invention may be more readily understood, this embodiment being described with reference to the accompanying drawings, in which:

FIGURE 1 is a pictorial view illustrating parachute apparatus according to this invention and including a main or personal parachute, a drogue parachute and a controller parachute, such apparatus being shown in use in the descent of an airman after release from an aircraft ejection seat that has been ejected from an aircraft in an emergency and at a low relative air speed and at a low level, the controller parachute and the drogue parachute as well as the main or airman's personal parachute all being fully deployed;

FIGURE 2 is an enlarged pictorial view showing the crown of the main or airman's personal parachute and the method of attaching an anti-squid line to said crown and to the draw line of the preceding parachute;

FIGURE 3 is an enlarged pictorial view showing the method of attaching the shroud lines and the said anti-squid line of the main or airman's personal parachute to the airman's harness; and FIGURE 4 is a view similar to FIGURE 1 with the exception that it shows the results of deploying the parachutes at a high relative air speed, the main or airman's personal parachute being shown in a squidding condition as a result of the anti-squid line having broken due to the excessive pull exerted thereon by the controller and drogue parachutes due to the high relative air speed at which the parachute apparatus was deployed.

The parachute apparatus shown in the drawings is particularly suitable for use with an aircraft ejection seat, the parachute apparatus comprising three interconnected parachutes, i.e. a controller parachute 1 having an anti-squid line 2 as described in the said U.S. Patent No. 2,999,659 and which anti-squid line is intended to resist breakage when the controller parachute is released at high relative air speeds, a drogue parachute 3 and a main or personal parachute 4. The controller parachute is projected from the aircraft ejection seat at the appropriate time by means of a projectile or piston 5 fired from a drogue gun on the ejection seat. Delay in the deployment of the controller parachute 1 is prevented by the provision of the anti-squid line 2 which extends from the crown of the controller parachute 1 to the junction of the shroud lines 6 of the latter where the anti-squid line and the shroud lines are connected to a draw line 7 in turn connected to the cross lines at the crown of the drogue parachute 3 of which the shroud lines are connected by a line 8 to the crown of the main or personal parachute 4 as shown in FIGURE 2, the line 8 looping around the intersecting cross lines 9 at the apex of this parachute.

The shroud lines 10 of the main or personal parachute 4 are connected in four groups respectively to four lift webs 11 by buckles 12 (FIGURE 3), the lift webs 11 being attached to the airman's harness. Anti-squid means in the form of an anti-squid line 13 extend from one of the two front buckles 12 upwardly within the main parachute 4 to the crown of the latter where the anti-squid line is looped through the loop at the lower end of the line 8 connecting the crown of the parachute 4 to the shroud lines of the drogue parachute 3, is knotted at this position as indicated at 14, FIGURE 2, and is then returned to the other front buckle 12.

It will be seen that the atni-squid line 13 which is taken upwardly from one buckle 12 to the crown of the parachute 4 and then back to another front buckle 12 in fact constitutes two anti-squid lines which, when fully extended, define an elongated inverted "V" between them. If desired another such twin anti-squid line of this kind could extend from the rear two buckles 12 to which the shroud lines are attached and be taken to the crown of the parachute 4 as above explained.

Although two, or alternatively four, anti-squid lines 13 have been described, it will be appreciated that these may be replaced by any other appropriate number of anti-squid lines, e.g. by a single anti-squid line, designed to fulfill the same purposes as the lines described.

The tensile strength of the anti-squid line 13 or any combination of such line should be carefully chosen with regard to the particular circumstances, e.g. size of the canopy of the main or personal parachute 4, and the pull exerted on this parachute by the drogue parachute 3 at the so-called high relative air speeds on the one hand and the low relative air speeds on the other hand. Thus in a typical parachute apparatus for use by an airman in conjunction with an ejection seat and where the canopy of the main or personal parachute is of the standard 24 foot known form, the anti-squid line will conveniently comprise the dual line arrangement illustrated and the line will be formed of a polyester resin fibre such as polyethylene terephthalate and conveniently that sold under the registered trademark "Terylene," the line having a 400-lb. nominal breaking strength, but this value should in all cases be carefully chosen in accordance with the performance required, the capacity of the main or personal parachute 4 to resist bursting, the size of the preceding parachute of the series, and the number of anti-squid lines used in the main or personal parachute.

The arrangement is thus such that, when the controller parachute 1 is deployed by the projecting piston 5, the controller parachute is prevented (whether projected at high or low air speeds) from squidding by its anti-squid line 2 and is rapidly and fully deployed; the draw line 7 of the controller parachute then withdraws the drogue parachute 3 which, at high relative air speeds, squids before being fully deployed and then, when deployed, withdraws the main or personal parachute 4. When the withdrawal of the parachutes takes place at high relative air speeds between the ejection seat and the air, the main or personal parachute 4 is caused to squid as shown in FIGURE 4, the anti-squid lines 13 of the parachute 4 being snapped or broken by the pull exerted thereon by the preceding drogue parachute 3 and the main or personal parachute subsequently being gradually deployed as is desirable at high speeds; the anti-squid lines 13 of the main or personal parachute are, however, left intact as shown in FIGURE 1 when the seat ejection and the withdrawal of the parachutes is effected at low relative air speeeds, the lines 13 thus preventing squidding of the main or personal parachute and ensuring its rapid full deployment. Since an airman may have to be ejected from an aircraft and then landed on the ground all within the short period of about five seconds, it will be appreciated that in such a case it is essential that the main or personal parachute should be fully deployed in the shortest possible interval of time.

Although the anti-squid means or line or lines of the main parachute have been described above as being connected, at the end or ends thereof remote from the crown of the main parachute, to lift webs for supporting an airman or other object, it should be understood that the said anti-squid means may be attached, with no detriment to its function, to any part of the object to be supported by the main parachute or to any part of the means for attaching such object to the parachute rather than directly to the shroud lines or the lift webs. Moreover the anti-squid means may be connected to the crown of the main parachute or adjacent to such crown in any appropriate manner and need not necessarily be attached to the cross lines at the crown of the parachute as above described although there is a preferred arrangement.

I claim:

1. Parachute apparatus comprising a main parachute and a drogue parachute interconnected in series, said main parachute having a crown and being deployable between a squidding position and a deployed position, said drogue parachute being adapted to exert a pull on the crown of said main parachute, the magnitude of said pull varying with the relative air speed of said apparatus when a predetermined load is carried by said main parachute; and flexible anti-squid means on said main parachute responsive to the pull exerted by said drogue parachute to prevent the main parachute from squidding at low relative air speeds and thus to speed opening of said main parachute at such speeds, and to permit the main parachute to squid at high relative air speeds, thereby to reduce the rate of opening of the main parachute at such high relative air speeds.

2. An apparatus as set forth in claim 1, wherein said anti-squid means includes a flexible anti-squid line having one end portion affixed to the crown of the main parachute and another end portion remote from said crown; means for connecting said other end portion to said load for transmitting the pull of said drogue parachute to said load when said main parachute is in said deployed position, said anti-squid line being responsive to the pull exerted by said drogue parachute at said high air speeds to release said load.

3. An apparatus as set forth in claim 2, wherein said anti-squid line is breakable and adapted to break responsive to the pull of said drogue parachute at said higher speeds.

4. Parachute apparatus comprising, in combination:
(a) a main parachute deployable between a squidding position and a deployed position, said parachute having a crown portion and an annular portion, said parachute when in the deployed position having an axis passing through said crown portion, and said annular portion being radially spaced about said axis;
(b) a plurality of elongated flexible shroud means having respective first and second longitudinal end portions, each said first end portion being secured to said annular portion;
(c) fastening means on said second end portions for jointly securing the same to a load carried by said parachute, said fastening means in the deployed condition of said parachute when carrying said load being spaced from said crown portion a first predetermined distance, and being movable away from said crown portion a second predetermined distance greater than said first distance when said parachute is in said squidding position thereof;

(d) elongated anti-squid line means secured to said crown portion and to said fastening means, said anti-squid line means having an effective length between said crown portion and said fastening means which is at least as great as said first distance and smaller than said second distance, a portion of said anti-squid line means having a predetermined breaking strength;

(e) a drogue parachute; and (f) draw line means connecting said drogue parachute to said crown portion for exerting an axial pull thereon, said pull at a constant weight of said load being lower at a lower air speed of said drogue parachute and higher at a higher air speed thereof, the breaking strength of said portion of the anti-squid line means being greater than said lower pull and smaller than said higher pull.

5. Parachute apparatus as set forth in claim 4, wherein said anti-squid line means includes a plurality of anti-squid lines arranged in parallel to connect said crown portion to said fastening means.

6. Parachute apparatus as set forth in claim 4, wherein said fastening means include a plurality of lift webs, each of said lift webs being secured to a plurality of said second end portions, and said anti-squid line means being secured to one of said lift webs.

7. Parachute apparatus as set forth in claim 4, further comprising a controller parachute, said drogue parachute having a crown portion; a draw line connecting said controller parachute to the crown portion of said drogue parachute; and anti-squid line means for preventing squidding of said controller parachute.

References Cited in the file of this patent
UNITED STATES PATENTS

| | | |
|---|---|---|
| 2,970,795 | Gold | Feb. 7, 1961 |
| 2,999,659 | Martin | Sept. 12, 1961 |